United States Patent [19]
Venkatraman et al.

[11] Patent Number: 5,844,973
[45] Date of Patent: Dec. 1, 1998

[54] CONFERENCE BILLING SYSTEM WITH ID TAGGING

[75] Inventors: Arunachalam Venkatraman, Cedar Rapids, Iowa; Louis G. Gottlieb, Colorado Springs, Colo.; Larry Ray DeVries, Newhall, Iowa

[73] Assignee: MCI Communications Corporation, Washington, D.C.

[21] Appl. No.: 496,619

[22] Filed: Jun. 29, 1995

[51] Int. Cl.[6] .................................................. H04M 15/00
[52] U.S. Cl. ........................ 379/127; 379/116; 379/118; 379/119
[58] Field of Search .................................... 379/112, 113, 379/114, 116, 118, 119, 127, 142, 201, 202, 204, 206

[56] References Cited

U.S. PATENT DOCUMENTS

| | | | |
|---|---|---|---|
| 4,481,383 | 11/1984 | Madon | 379/112 |
| 4,788,719 | 11/1988 | Gupta | 379/114 |
| 4,796,293 | 1/1989 | Blinken | 379/204 |
| 5,099,510 | 3/1992 | Blinken | 379/202 |
| 5,381,467 | 1/1995 | Rosinski et al. | 379/114 |
| 5,408,526 | 4/1995 | McFarland | 379/114 |
| 5,483,588 | 1/1996 | Eaton | 379/202 |
| 5,495,522 | 2/1996 | Allen | 379/202 |
| 5,546,449 | 8/1996 | Hogan | 379/201 |
| 5,631,904 | 5/1997 | Fitser et al. | 379/127 |

*Primary Examiner*—Vijay Shankar

[57] ABSTRACT

A conference billing system with ID tagging allocates charges for a conference based on a prior reservation. The billing system also supports different tariffs and pricing structures for individual call legs in the conference, such as audio, video, digital data, or mixed. In addition, the billing system prepares a consolidated bill for dial-in and dial-out calls based on a unique ID assigned to each conference. The bill contains the description of the conference with its individual call legs grouped together for easy identification and verification by the customer, even though the individual call legs of the conference may be serviced by different long distance switching offices.

20 Claims, 8 Drawing Sheets

FIG. 1

| Call Type | | Record Type | Feature Code | Location Of Conference Id |
|---|---|---|---|---|
| 1. | VNET Dial Out | PNR | 10 | Supp Code [5-11] |
| 2. | VNET Meetme | PNR | 13 | Called Party Number [11-17] |
| 3. | 800 Meetme | CDR | 13 | Called Party Number [11-17] |
| 4. | Toll Meetme | CDR | 13 | Called Party Number [11-17] |
| 5. | DDD/IDDD Dial Out | PNR | 10 | Supp Code [5-11] |

| Leading Digit of Conference Id | Conference Media | Sort Key Indicator for Media |
|---|---|---|
| 0,1,6,7 | Audio | A |
| 2,3 | Video | B |
| 4,5 | Mixed | C |

FIG. 8B

| Access Type | Sort Key Value for Access Type |
|---|---|
| 800 Meetme | 1 |
| Toll Meetme | 2 |
| VNET Meetme | 3 |
| DDD Dialout | 4 |
| IDDD Dialout | 5 |
| VNET Dialout | 6 |

5,844,973

CONFERENCE BILLING SYSTEM WITH ID TAGGING

FIELD OF THE INVENTION

This invention relates to communications systems and, in particular, a billing system for audio, digital data, video, or mixed conference calls.

BACKGROUND OF THE INVENTION

A conference call is generally set up by a conference leader who makes a conference reservation, controls the conference and typically pays for most of charges. The conference call allows multiple parties, i.e., conferees or conference participants, to transmit audio, video, digital data or a combination of the data types to each other. This form of conference replaces the "traditional" in-person conference requiring the participants to be present in the same location. The convenience and proliferation of conference calls have produced a number of patents in the field, some of which are represented by U.S. Pat. Nos. 4,796,293 and 5,099,510 both by Blinken et al (hereinafter Blinken).

Telephone and video conferencing systems in the Blinken patents disclose various enhancements to conferencing techniques via a service computer. For example in the '510 patent, the service computer is programmed to partition multiple ports of a conference bridge which is a microprocessor-controlled device for interconnecting callers. In the '293 patent, the service computer causes the conference bridge to execute various functions via control means.

While Blinken describes various enhancements to conferencing systems, the billing administration of a conference, including customer charges, is not addressed in the above patents. On this subject, U.S. Pat. No. 4,481,383 to Madon discloses a system for monitoring network facilities, such as trunks, used by conference participants. The system dynamically adjusts the charges for the conferees based on the state of the network facilities, such as idle, active, in reserve, etc. Charges will be incurred only when the facilities are active and reserved, and not when the facilities are idle. If, for example, a conferee is inadvertently disconnected from an active port, billing for that path is adjusted to account for the disconnected call.

Although the Madon patent refers to the billing administration, it does not disclose flexible allocation of charges to conference participants based on a prior reservation by a conference leader. Among other features not disclosed in the Madon patent, also absent is support for different tariffs or pricing structures for individual call legs in the conference.

Furthermore, a typical invoice listing long distance charges does not separate conference calls from non-conference calls. Call legs from different conferences, as well as toll non-conference calls, are simply listed in time sequence on the customer's invoice. The customer cannot, therefore, easily determine or verify the call legs associated with a particular conference from such call-intermingled invoice. A need, therefore, exists for a billing system which provides these and other billing features for a conference in audio, video or digital data environment, as well as the combination of the data types.

OBJECTS OF THE INVENTION

It is therefore an object of the invention to allocate charges for a conference call based on a prior reservation.

It is another object of the invention to support separate tariffs or pricing structures for various types of call legs, such as audio, video or digital, as well as their combinations.

It is yet another object of the invention to support separate tariffs or pricing structures for individual dial-in or dial-out call legs of a conference.

It is still another object of the invention to prepare a consolidated bill displaying the description of a conference with its individual call legs grouped together for easy identification and verification by a customer.

SUMMARY OF THE INVENTION

These and other objects, features and advantages are accomplished by a conference billing system with ID tagging which processes billing information for a conference in a telecommunications network of a common carrier.

The disclosed invention comprises a reservation system, a database, a switch, a conference bridge and conference billing processing means. Prior to the conference, the reservation system creates a reference file about the conference based on information provided by a conference leader. Also created is an identifier, i.e., conference ID, which is assigned for each conference by the reservation system. After the creation of the identifier, the disclosed invention processes dial-in and dial-out calls differently.

For dial-in calls, a database, which provides a routing information, tags each individual dial-in call of the conference with the conference ID at the conference time. The calls are then routed to a conference bridge for connecting each call to the corresponding conference.

For dial-out calls, the conference bridge operator receives the conference ID and the conferee's number from the reservation system and dials the conferee. The call then proceeds to the switch which queries the database for instructions on what to do with the call. The database responds by directing the switch to request the conference ID from the conference bridge. After receiving the conference ID, the switch tags a dial-out call of the conference with the conference ID during a call setup.

When either the dial-in or dial-out call is completed, the switch creates a call record, which includes the conference ID, and transfers the call record to the conference billing processing means comprising a traffic processor and a billing processor. The traffic processor identifies those records pertaining to a conference and also performs customer identification processing. The call records are then forwarded to the billing processor. The billing processor identifies the toll records as dial-in or dial-out call types from a field on the toll record. The billing processor then obtains the reference information for the conference from the reference file produced by the reservation system and merges the information in the reference file with the toll record to create a merged billing record.

Further in accordance with the invention, the billing processor generates various sub-headings for sorting the records on the invoice. It also determines prices for a toll record and a feature charge record. The billing processor finally prints the invoice, generating sub-totals at various grouping levels.

DESCRIPTION OF THE PREFERRED EMBODIMENTS

Prior to a conference, a leader reserves a conference bridge which, as explained earlier, permits conferees from several locations to be connected together for a conference call. As known in the art, the conference bridge includes means for amplifying and balancing data. The leader typically contacts a reservation operator of the common carrier who schedules and reserves the conference bridge based on the leader's requirements. The following information is typically requested by the reservation operator to schedule a conference:

Customer's Corporate Name
Customer's Authorization Code
Customer's Name
Date of Call
Type of Call
Start Time
Estimated Duration
Number of Participants
Requested Features (taping, translation, etc.)
Names and Telephone Numbers for Dial-out Participants The reservation operator typically enters the above data into an application program running on a computer in a reservation system. Based on the information, the reservation system creates a reference file for the conference. Some of the information taken during the reservation process is subsequently used in a billing system as described below. At the end of the reservation process, the conference leader is given a reference number, the number to dial for meet-me calls, and a password or an access code.

After the reservation is taken, the reservation system uses the conference information to allocate and configure the conference bridge. The reservation system also assigns a unique identifier, i.e., a conference ID, to each conference used by the billing system in processing individual calls, as will be more clearly understood from the description below.

At the scheduled time of the conference, a participant dials the telephone number to join the conference. The call is then connected to the conference bridge, and a recorded announcement is played to the caller. In response to the announcement, the conferee enters a password and is connected to the conference based on the entered password. Alternatively for dial-out calls, the participant may be placed into the conference by a conference bridge operator who dials and queries the participant for the access code. The conference bridge operator calls the participants at the predetermined time in a dial-out call. Conferee's validation and connection then proceeds similar to the dial-in call.

After either the dial-in or dial-out call, the conference information is passed to the billing system. Data comprising the requested features, i.e., taping, welcome discount, translation, etc., is also passed to the billing system. Charges for these features, as well as other information on the conference call, as explained below, will appear on the customer's invoice based on the conference ID assigned by the reservation system.

Figure 1:
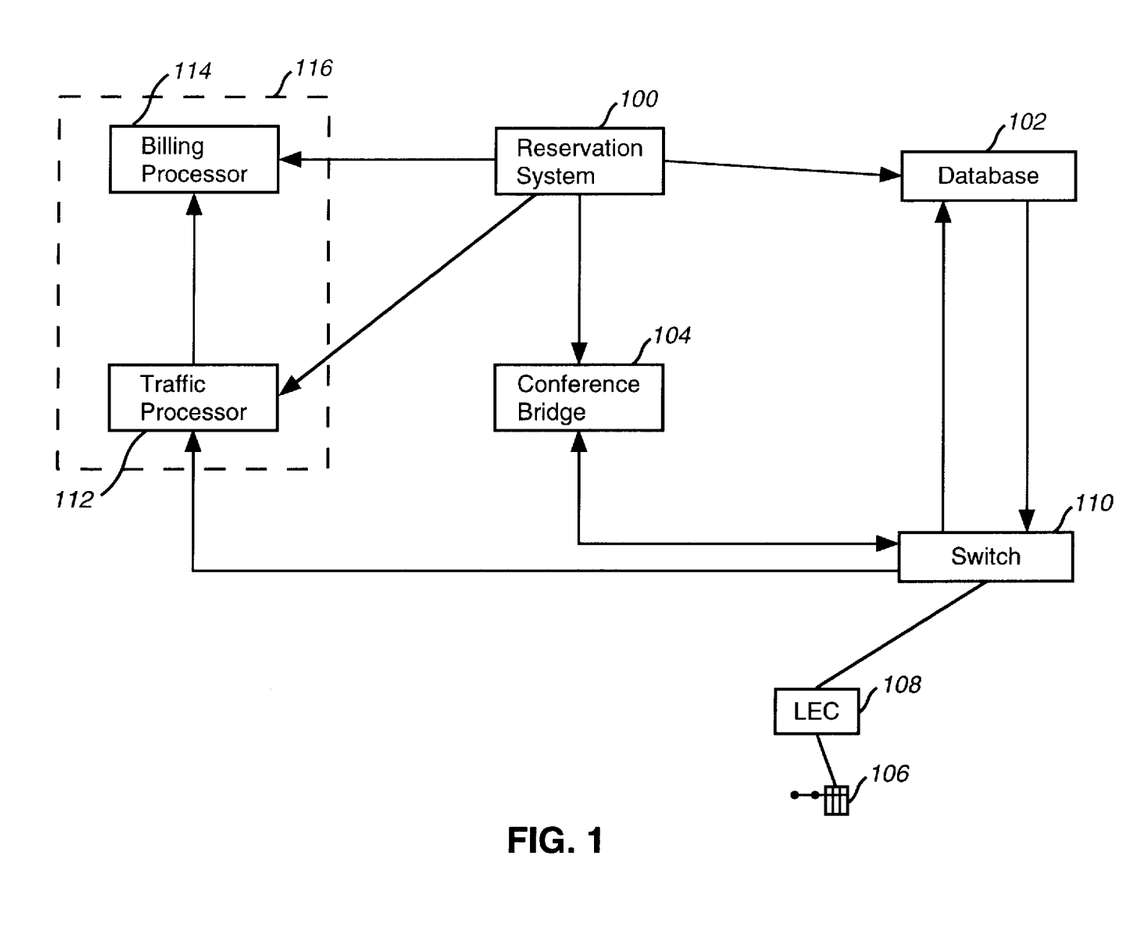
FIG. 1 illustrates a high level architecture of the conference billing in a common carrier system.

FIG. 1 illustrates a high level architecture of the conference billing, as explained above. At the time of reservation, a reservation system 100 designates the following parameters for a conference call, creating a reference file in the system:

Time of Day and Day of Year in the Eastern Standard Time

Termination ID for a conference bridge which comprises a terminating switch ID and a terminating trunk group ID (TSID/TTG)

Feature Code 13 or 10 identifying a telephone call as a conference call seven (7) digit conference ID Prior to the start of the conference, the reservation system 100 transfers the information received from a leader to a database 102 which may be either remotely located from or co-located with the reservation system. Also prior to the conference, a conference bridge 104 is configured via the information provided by the conference leader during the reservation.

At the start of the conference, a conferee 106 dials, for example, 1-800 number to participate in a conference. The call is connected via a LEC 108 to a long distance carrier switch 110 which queries the database 102 for routing information. The database 102 identifies the call as a conference call and along with the routing information returns the feature code 10 or 13, a terminating switch ID and a terminating trunk group ID (TSID/TTG), and a seven (7) digit conference ID. The feature code 10 or 13 denotes that this call is a conference call; the terminating switch ID and terminating trunk group ID (TSID/TTG) represent a routing information used by the conference bridge 104; and the seven (7) digit conference ID tags the call to uniquely identify its association with a particular conference. After receiving this information, the switch 110 routes the call to the conference bridge 104.

Based on the conference ID, the conference bridge 104 plays a generic or customized announcement prompting the conferee for the password. After the password is verified by the conference bridge 104, the conferee's call is established in the network.

For a dial-out call, the conference bridge 104 receives the conference ID and the conferee's number from the reservation system 100 and dials the conferee. The call then proceeds to the switch 110 which queries the database 102 for instructions on what to do with the call. The database 102 responds by directing the switch 110 to request the conference ID from the conference bridge 104. After receiving the conference ID, the switch 110 tags the dial-out call of the conference with the conference ID during a call setup.

When either the dial-in or dial-out call has been completed, the switch 110 generates a call record comprising, for example, the dial-in or dial-out number, calling party number (ANI), called party number, terminating switch ID and terminating trunk group ID (TSID/TTG), and the conference ID assigned to the conference. The switch 110 passes the call record to a traffic processor 112 which subsequently passes the record to the billing processor 114. The billing processor 114 processes the call record and generates complete billing information, as explained below, based on a conference ID located in each call record. Also at the call completion, the reservation system 100 sends a list of call features to the traffic processor 112 and the billing processor 114 to accumulate complete billing information about the conference, as more fully explained below.

Although the above conference call procedures were described with reference to specific types of call, the same procedure applies to other types of call, such as the ones listed in FIG. 2.

FIG. 1 shows conference billing processing means 116 comprising the traffic processor 112 and the billing processor 114 which are part of an overall billing of a common carrier. Billing systems are typically back-end systems which are not on the common carrier's network. The call records are generated in the network after the call completion and are thereafter sent to the billing systems for the appropriate processing.

In the disclosed invention, the traffic processor 112 precedes the billing processor 114 and is a first part of the billing. Thus, the traffic processor 112 identifies call records involved in a conference and forwards them to the billing processor 114. The toll call is a call to any location outside the local service area, i.e., a long distance call.

Figure 2:
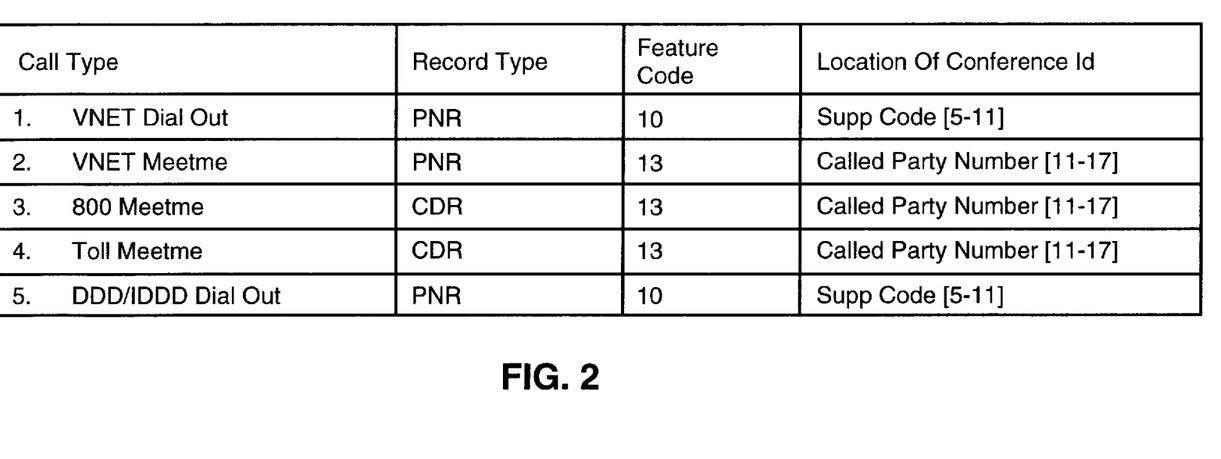
FIG. 2 illustrates a conference call record comprising information for processing by a traffic processor.

The traffic processor 112 receives the records for various types of toll conference calls listed in FIG. 2. The record type, such as Call Detail Record (CDR), Private Network Record (PNR), Operative Services Record (OSR), etc., is produced by the switch 110 of the long distance carrier. The format of the record is dictated by the call type as well as other call-specific characteristics and is not limited to the ones listed in FIG. 2.

The first call type in FIG. 2 is a Vnet® dial-out call. It is a call on a Virtual Private Network in which a common carrier operator originates the communication with conferees for the conference. The second call type of FIG. 2 is a Vnet® meet-me which is also a Virtual Private Network call where an arrangement is made by which any caller can dial a telephone number and using a specific access code can join a conference with other users. Meet-me calls are also referred to as dial-in calls, and both terms are used interchangeably in this specification.

FIG. 2 further shows an 800 meet-me call as number 3 in the Call Type column. A conferee makes a toll-free 800 call and uses an access code, as described above, to participate in the conference. Listed as number 4 is a toll meet-me call. Similar to the 800 meet-me call, a conferee dials a conference telephone number (except a 1-800 number) if he wants to join the conference. The last call type of FIG. 2 is a Direct Distance Dialing (DDD) or International Direct Distance Dialing (IDDD) call in which the common carrier operator originates the communication with conferees for the conference. While the indicated record types correspond to the listed call types in FIG. 2, other types, as well as combinations of call and record types, are possible in the art. This list is not exclusive and merely describes the call types and record types for illustrative purposes only.

The records for conference calls are identified by a set of feature codes illustrated in FIG. 2. Dial-out calls, originated by a common carrier operator, are identified by a feature code 10 while meet-me calls, generated by conferees calling in, are identified by a feature code 13. Further depicted in FIG. 2 is a conference ID which uniquely identifies a conference and all call legs of the conference. It is a 7-digit number represented, for example, as the trailing digits of the Supplementary Code field on the PNR for a dial-out call. For a meet-me call using the PNR or CDR format, the Conference ID is located, for example, in the trailing digits of the Called Party Number field. The location of a conference ID, however, is not limited to the described locations in PNR and CDR, and may be placed anywhere in a call record based on a particular system configuration.

Using the feature code 10 or 13, the traffic processor 112 will identify the call as requiring special processing. The conference ID is then used by the traffic processor 112 to access the reference file corresponding to the conference call. The traffic processor 112 receives the reference file, previously generated by the reservation system 100, which contains the following information:

Conference ID

"Bill to Leader or Bill to Conferee" Indicator

Customer ID information for Bill to Leader (Corp ID and Service Location ID).

This information is applicable only for Vnet®-billed calls, since the traffic processor 112 performs customer identification function only for Vnet®-billed calls, as described below.

Next, processing of meet-me calls by the traffic processor 112 is described in detail. As stated above, a meet-me call is an arrangement by which any caller can dial a specific access code to join a conference with other users. The conferee would be recognized by the conference through the access code. Conferees may call in at a preset time or may be directed to do so by microprocessor-controlled means. Types of meet-me calls described in the specification are 800 meet-me, toll meet-me (DDD/IDDD), and Vnet® meet-me. The list of meet-me calls is not exclusive.

The leader reserving the conference call specifies how the billing must be performed for the entire conference. One of the options may be to bill all legs of the conference to the conference leader. The other option is to bill each Vnet® leg to the respective conferee. While Vnet® calls may be billed either to the leader or to the conferee, call legs using an 800 meet-me access or toll meet-me access are typically billed to the conference leader.

Figure 3A:
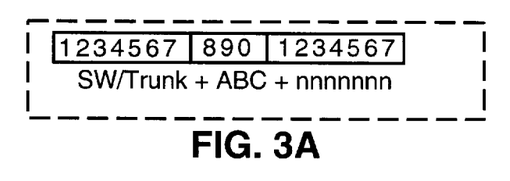
FIG. 3A illustrates a Called Party Number field on a Call Detail Record or Private Network Record denoting a conference ID in addition to other identifiers.

FIG. 3A shows the Called Party Number field in a CDR/PNR comprising the identifying information for a meet-me call. The last ten digits of the Called Party Number field are identified as 8–10 and 11–17 in FIG. 3A.

The digits ABC, occupying positions 8–10, have the following meanings. Digit A is typically 9 and may be any value other than 0 or 1. Digit B is 0, if the call is billed in non-Vnet® system to a non-Vnet® customer. Digit B is 1, if the call is billed in the billing processor 114 to a Vnet® customer. Digit B is 2, if the call is dropped and is not billed to anyone. Digit C is typically 0 and not used in the current embodiment.

The last 7 digits (11–17) of the Called Party Number field is the conference ID. The digits 1–7 in the Called Party Number field identify the switch and trunk of the call. These digits are not used by the traffic processor 112, and are merely listed for completeness.

Figure 4:
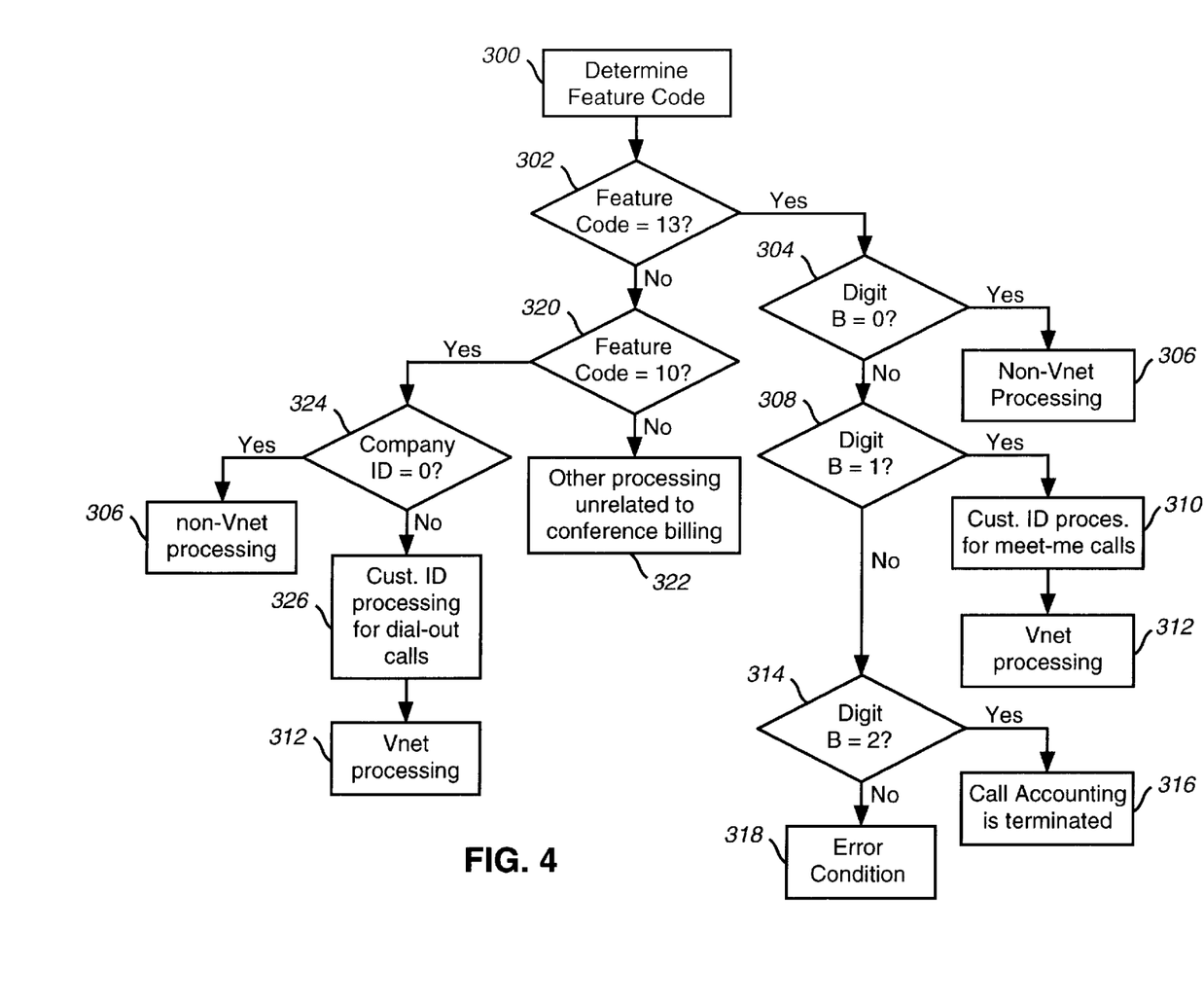
FIG. 4 is a sequencing flowchart for call processing by a traffic processor.

Referring to FIG. 4, the traffic processor 112 will process the meet-me calls as follows. In step 300, the traffic processor 112 obtains the feature code for the conferencing records from the CDR or PNR. In step 302, determination is made whether the feature code is 13, i.e., a toll record for a meet-me conference.

If it is a meet-me call, the traffic processor 112 checks Digit B in the Called Party Number field, as shown in step 304. All toll records are directed for non-Vnet® processing in step 306, as will be explained later, if the Digit B is 0. In step 308, another determination is made by the traffic processor 112 about the Digit B. When the Digit B is 1, processing of customer ID for the meet-me call will take place in step 310, as later explained with reference to FIG. 4. The processing by the billing processor 114 follows the customer ID processing in step 312 as will be further explained in more detail.

If the Digit B is 2, as ascertained in step 314, the accounting for this call leg is dropped in step 316. The accounting may be dropped for various reasons, such as incomplete call, the caller abandoning the call after dialing several digits, etc.

If any other digits (besides 0, 1 or 2) are present in Digit B, the traffic processor 112 will signal the error condition in step 318.

Figure 5:
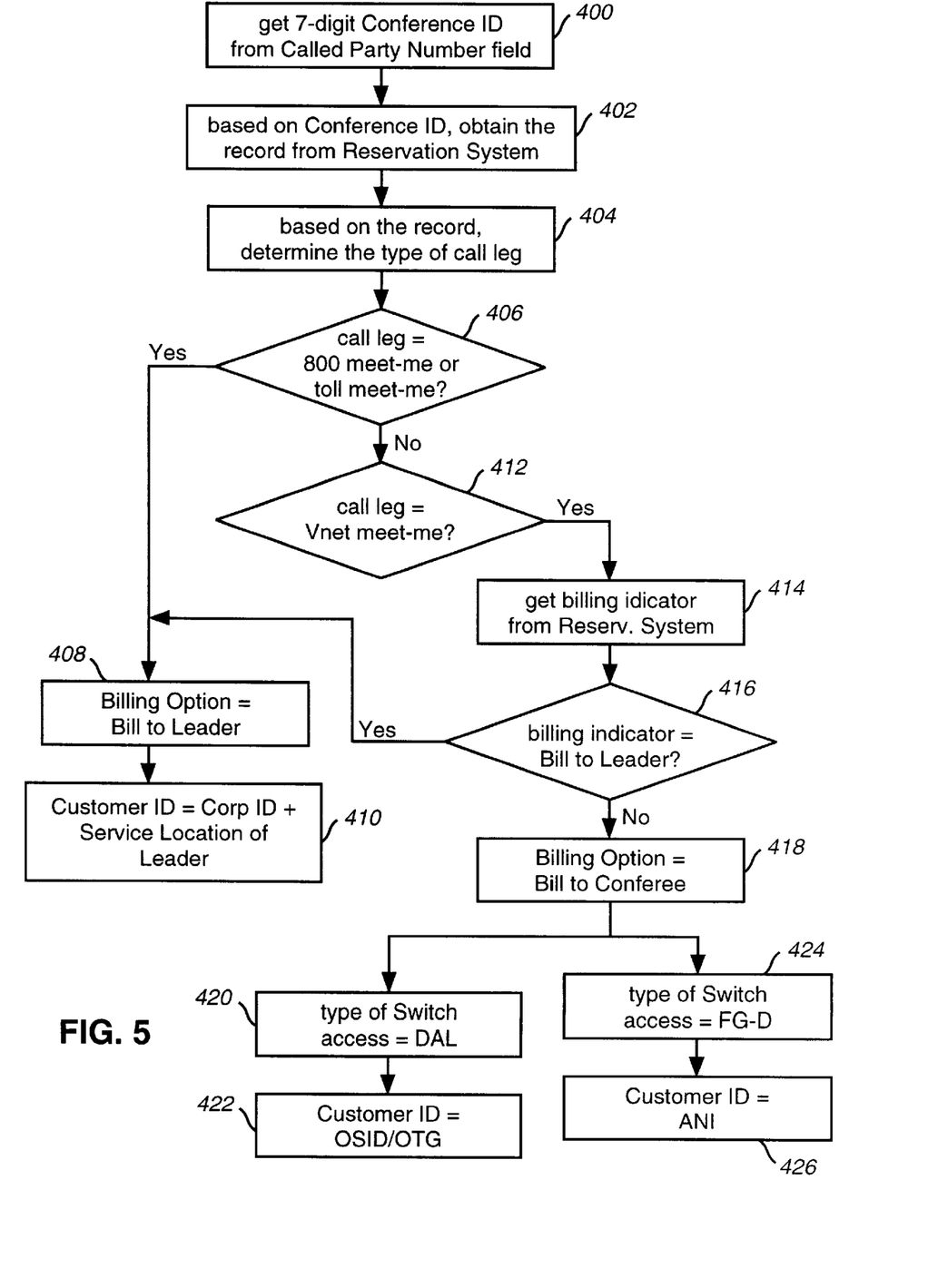
FIG. 5 is a sequencing flowchart for customer ID processing in meet-me calls.

Next, the processing of customer ID in step 310 is explained in detail with reference to FIG. 5. In step 400, the traffic processor 112 masks out the 7-digit conference ID from the Called Party Number field of the PNR or CDR. In step 402, based on the Conference ID, a record pertaining to the conference is obtained from the reservation system 100. The type of call leg is then determined from the record in step 404.

If the call leg is 800 meet-me or toll meet-me, as determined in step 406, the billing option is forced to "Bill to Leader" in step 408. As previously explained, call legs using an 800 meet-me access or toll meet-me access are billed to the conference leader. The traffic processor 112 then uses a combination of Corp ID and Service Location of Leader to generate a customer ID, as shown in step 410.

If in step 406, the call leg is not 800 meet-me or toll meet-me, another determination is made in step 412. For a Vnet® meet-me call leg, a billing indicator is obtained from the record generated by the reservation system 100, as shown in step 414. If the billing indicator is determined to be "Bill to Leader" in step 416, steps 408 and 410 are performed as previously described. Otherwise, the billing option is set to "Bill to Conferee" in step 418.

For Dedicated Access Line (DAL) type of switch access (step 420), the customer ID is based on the originating switch ID and originating trunk group (OSID/OTG) as shown in step 422. For a line arrangement leading to the switch 110 known as Feature Group D (FG-D) of "equal access", as shown in step 424, the customer ID is the telephone number of the calling party (step 426) obtained from Automatic Number Identification detecting means.

Figure 6:
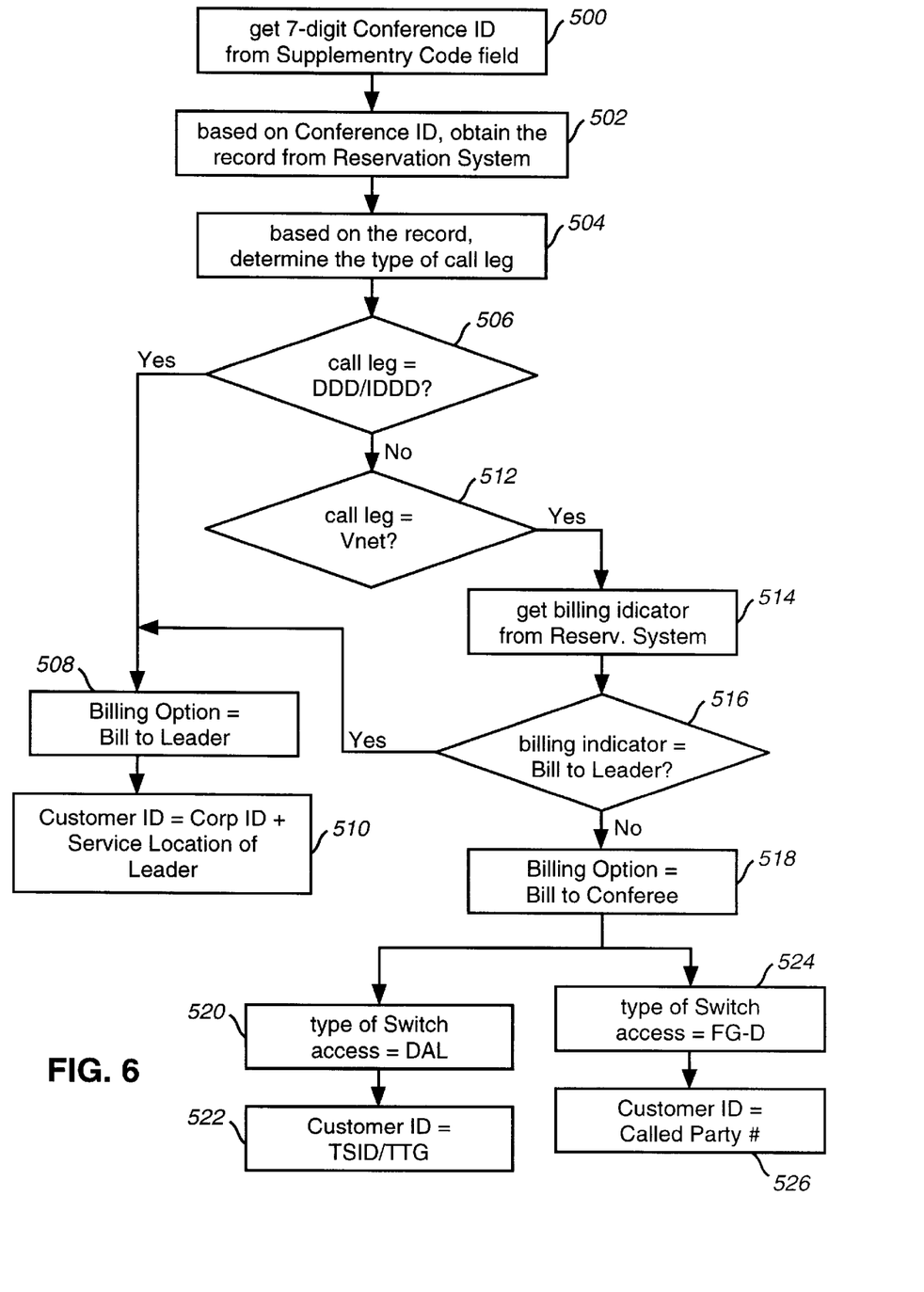
FIG. 6 is a sequencing flowchart for customer ID processing in dial-out calls.

Next, dial-out calls are described with reference to FIGS. 3B, 4 and 6. As stated earlier, types of Dial-out Calls used as merely illustrative of one feature of the invention are DDD/IDDD and Vnet®.

The leader reserving the conference call specifies how the billing is to be performed for the entire conference. As in meet-me calls, the options are to bill all legs of the conference to the conference leader or to bill each Vnet® leg to the respective conferee. While Vnet® dial-out legs may be billed to the leader or to the conferee, DDD/IDDD dial-out call legs are billed to the conference leader. This arrangement is used for illustration only, and it is understood that the disclosed invention may use other arrangements or combinations known in the art.

Figure 3B:
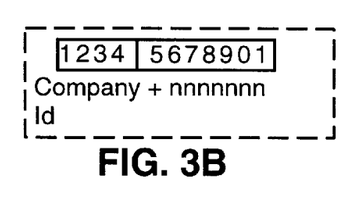
FIG. 3B illustrates a Supplementary Code field on a Private Network Record denoting a conference ID in addition to other identifiers.

FIG. 3B shows the Supplementary Code field on PNR having the following information for a dial-out call. The first 4 digits of the Supplementary Code (positions 1–4) include the Company ID for identifying the dialing plan for routing. For non-Vnet® billed calls, which do not require Vnet® routing, the company ID is 0000 occupying the first 4 digits. The last 7 digits of the Supplementary Code field (positions 5–11) denote the conference ID.

The traffic processor 112 will process dial-out calls in accordance with FIG. 4. In step 320, determination is made whether the feature code is 10, i.e., a toll record for a dial-out conference. If the feature code is not 10, other billing processing, unrelated to conference billing, will follow in step 322. If, however, the feature code is 10, the traffic processor 112 checks whether the company ID is 0000 in step 324. If so, non-Vnet® processing occurs in step 306. If company ID field is not 0000, customer ID processing for dial-out calls will take place in step 326 with subsequent processing by the billing processor in step 312.

The customer ID processing logic in step 326 is explained in detail with reference to FIG. 6, which is very similar to the processing logic for the meet-me calls. Thus, the traffic processor 112 masks out the 7-digit Conference ID from the Supplementary Code field of the PNR, as shown in step 500. In step 502, based on the Conference ID, a record pertaining to the conference is obtained from the reservation system 100. The type of call leg is then determined from the record in step 504.

If the call leg is a DDD/IDDD dial-out, as determined in step 506, the billing option is forced to "Bill to Leader" in step 508. DDD/IDDD dial-out call legs are billed to the conference leader. Similar to meet-me calls, the traffic processor 112 uses a combination of Corp ID and Service Location of Leader to generate a customer ID, as shown in step 510.

If, in step 506, the call leg is not DDD/IDDD, another determination is made in step 512. For a Vnet® dial-out call leg, the billing indicator is obtained from the record generated by the reservation system 100 in step 514. If the billing indicator is determined to be "Bill to Leader" in step 516, steps 508 and 510 are performed as previously described. Otherwise, the billing option is set to "Bill to Conferee" in step 518.

For Dedicated Access Line (DAL) type of switch access (step 520), the customer ID is based on the terminating switch ID and terminating trunk group (TSID/TTG) as shown in step 522. For a line arrangement leading to the switch 110 known as Feature Group D (FG-D) of "equal access", as shown in step 524, the customer ID is the telephone number of the called party (step 526).

Next, the processing of the billing processor 114 performed in step 312 of FIG. 4 is described. The billing processor 114 performs billing for Vnet® customers. It will bill the various types of conference calls, listed in FIG. 2 as well as other similar types known in the art. The record types produced by the switch 110 and the values and locations of relevant fields are shown in FIG. 2, as explained earlier.

As previously stated, the records for conference calls are identified by a set of feature codes 10 or 13. Dial-out calls are identified by a feature code 10 and meet-me calls by a feature code 13. The conference ID is a 7 digit number that is present as the trailing digits of the Supplementary Code field on the PNR for a dial-out call, and is present as the trailing digits of the Called Party Number field on the PNR or CDR for a meet-me call.

Prior to processing the call, the billing processor 114 will receive a file from the reservation system 100 with the following attributes for each conference call:

Conference ID
Conference Leader's Corp ID and Service Location ID
Conference Description (used to sequence calls on an invoice)

House 800 number; toll meet-me 800 number; personal 800 number

Toll meet-me number

Attended/Unattended Indicator for meet-me legs

Attended/Unattended Indicator for dial-out legs

The billing processor 114 will receive another file from the reservation system 100 with the feature charges and credits for the conference call. The attributes of the feature file are:

Conference ID

Conference Leader's Corp ID and Service Location ID

Feature Charge/Credit Code

Feature Charge Description for Feature Code of MISC

Duration or Count or Currency Amount

Charge/Credit Indicator

For standard charges and credits, only the feature code and Duration/Count is specified, while the pricing will be done by the billing processor 114. If the feature charge or credit is not standard, then a feature description and dollar amount will be present, and the feature code will indicate a miscellaneous (MISC) charge.

Figure 7:
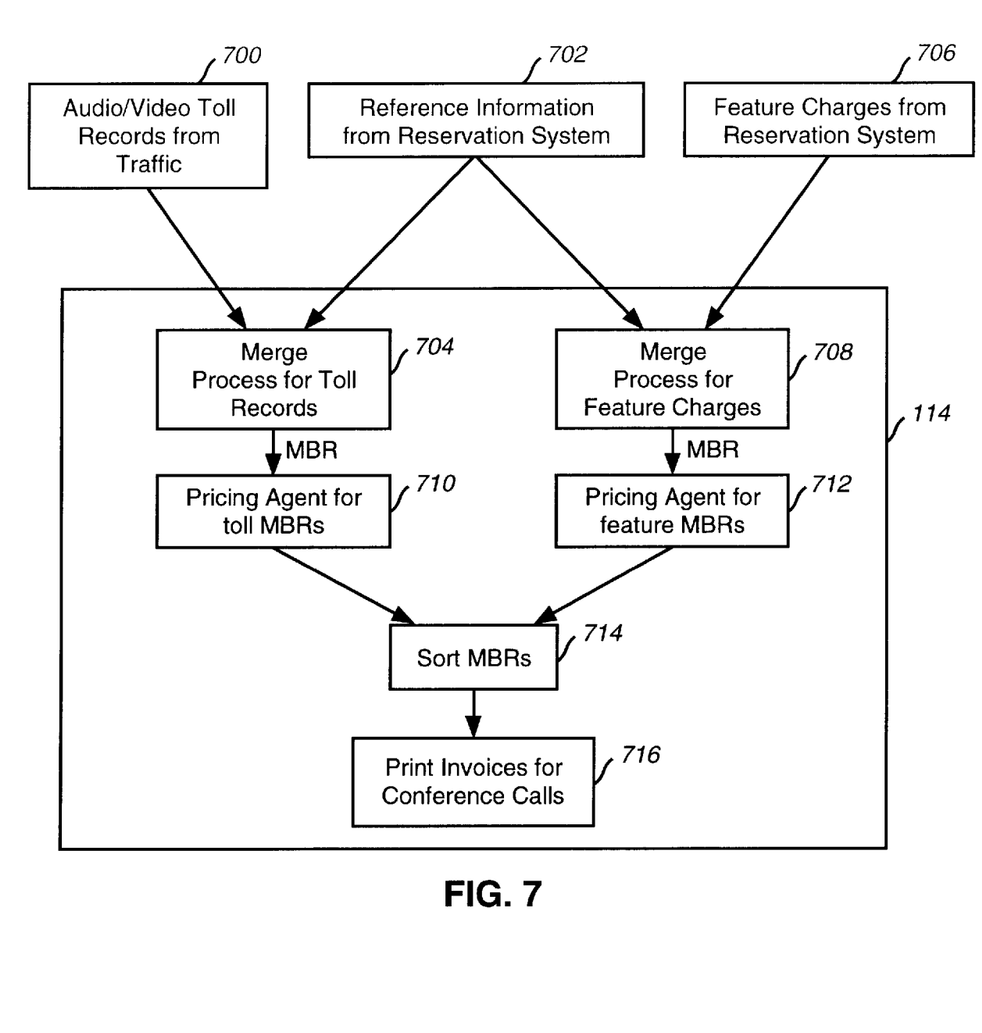
FIG. 7 is a high level flowchart for merging billing records and generating a single billing record of a conference.

During call processing, the billing processor 114 performs the following steps during a conference call billing, as shown in FIG. 7:

1. The billing processor 114 identifies the toll records as meet-me or dial-out call leg types. The feature code on the toll record is used for identifying the call leg type. If the feature code is 10, the toll is for a dial-out leg. If the feature code is 13, the toll is for a meet-me leg.

2. The billing processor 114 determines the conference ID based on the call leg type from the appropriate field on the toll record. If the feature code is 10, the conference ID is the last 7 digits of the Supplementary Code field of the toll record. If the feature code is 13, the conference ID is the last 7 digits of the Called Party Number field of the toll record.

3. The billing processor 114 obtains the toll records produced by the switch 110 and processed by the traffic processor 112 for Vnet® calls, as shown in step 700 of FIG. 7.

4. The billing processor 114 obtains the reference information about the conference from the file produced by the reservation system 100, using the conference ID as the access key, as shown in step 702 of FIG. 7. The billing processor 114 receives the reference information for each conference call in a file from the reservation system 100. Each record in this reference file is keyed to the conference ID.

5. The billing processor 114 merges the information in the file from the reservation system with the toll record to create a merged billing record (MBR) in step 704. Similarly, the reference record and each feature charge record, received in step 706, will be merged to form a merged billing record (MBR). FIG. 7 shows the merging of records in step 708.

Figure 8A:
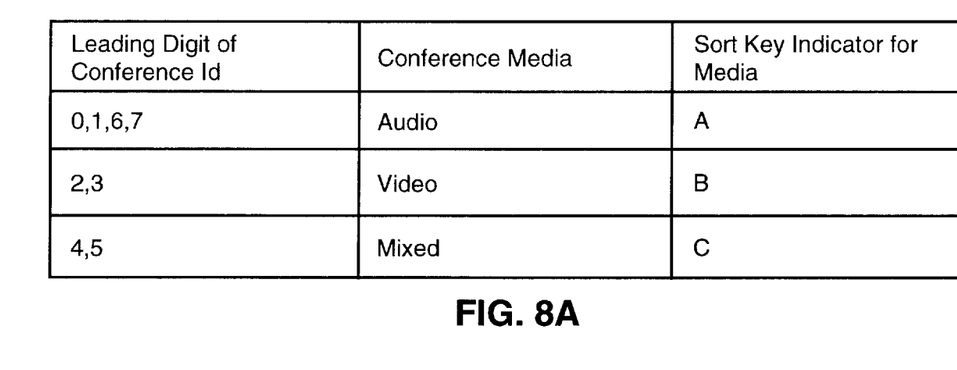
FIG. 8A illustrates a translation table for various types of conference calls.
Figure 8B:
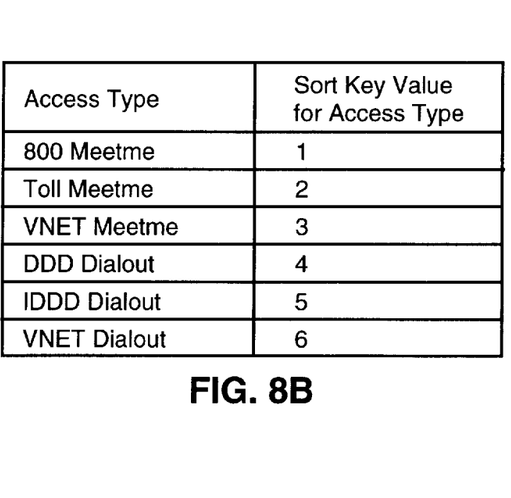
FIG. 8B illustrates an assignment table of sort keys for various access types.

6. The billing processor 114 generates various sub-headings or keys used in sorting the fields in each invoice. These sub-headings appear on the merged billing record (MBR). As an example, the billing processor 114 may use the following sub-headings for the toll and feature charges for conference calls under each customer:

a. Customer ID. It comprises Corp ID and Service Location ID. The Corp ID and Service Location ID are obtained from the Customer ID information passed by the traffic processor 112.

b. Media Indicator (Audio/Video/Mixed Audio-Video, etc.). The conference ID has the Media Indicator for the conference encoded in the leading digit. This digit is translated into a sort key field as shown in FIG. 8A. The purpose of this sort key field is to sequence the calls on the invoice by media type. For example, audio calls for the billing period will be printed on the invoice first, followed by the video calls, while the mixed audio/video calls will be printed in the end. Although not shown, other media types, such as digital data as well as combinations of various media types, may be used and are within the scope and spirit of the disclosed invention.

c. Conference Description. The conference description is obtained from the reference file received by the billing processor 114 from the reservation system 100. This is a customized description of the conference which is either generated by the reservation system 100 based on a preset rule for the customer or supplied by the conference leader at the time of making a reservation.

d. Conference ID. The conference ID is the first major group level at which a sub-total is printed on the invoice. If two conferences for the same media type have the same description, the billing processor 114 will distinguish between the two based on the conference ID by grouping the call legs together, and generating and printing sub-totals for each conference.

e. Toll/Feature Indicator. The Toll/Feature Indicator will be set based on whether the merged billing record (MBR) was created for a toll charge or a feature charge. This indicator is used, for example, to sequence the toll charges ahead of the feature charges on the invoice.

f. Call Origination Date and Time. The Call Origination Date and Time is obtained from the toll record for a toll charge and from the feature charge record for a feature charge.

g. Access Type. The Access Type field of the sort key distinguishes between the access types as shown in FIG. 8B and is used to sequence the conference legs on the invoice by access type. The feature code values 10 and 13 identify either a dial-out or meet-me conference leg, respectively. The DDD and IDDD dial-out call legs are identified by scanning the dialed digits and the Called Party Number field on the PNR. The toll record is a CDR for a Toll meet-me call as well as for a 800 meet-me call. The reference file from the reservation system 100 distinguishes between the two as follows. If the dialed digits on the CDR matches the toll Meet-me number in the reference file, the toll record is for a conference leg using Toll Meet-me access. If the dialed digits on the CDR matches the House or Personal Meet-me 800 number in the reference file, then it is a conference leg using 800 Meet-me access.

7. The billing processor 114 determines prices for the toll record based on media type (audio/video/digital data), call type (dial-out/meet-me), conference setup type (attended/unattended) and access type (800/Vnet®/DDD/IDDD), as shown in step 710 of FIG. 7. The tariff applied to a toll record for a conference leg comprises conference media, access type for the call leg, conference setup type, and special customer arrangements (SCA) in effect for the customer.

The Conference setup type (attended/unattended) is indicated in the reference file from the reservation system 100 for each conference ID. The required setup type is specified by the conference leader at the time of reserving the call. Alternatively, it may be based on a preset specification for the customer/leader. If, at the time of setting up the call, any variations occur, the charges for these variations will be entered as feature charges. For example, the leader on an unattended dial-out requests that a participant be dialed out by the operator. The tariffs for the special customer arrangement (SCA) are present in pricing tables in the billing processor 114.

8. The billing processor 114 determines prices for the feature charge record based on the feature code and pricing tables, as shown in step 712 of FIG. 7. The feature charge records are used to supply feature charges and credits to the billing processor 114 from the reservation system 100. For example, charges for taping, translation, credit for poor audio quality, "welcome" or a first time use discount, etc. The feature charge records from the reservation system 100 specify a feature charge code, a count or a duration for the charge, and the conference ID to which the charge or credit applies. The billing processor 114 will look up the charge description to print on the invoice from the pricing tables using the charge code.

In some cases, the actual charge or credit in currency (dollars) and a charge/credit description will be passed. This would apply where a special charge or credit applies to the call for which there is no present charge or credit code in the pricing tables.

9. The billing processor 114 sorts the merged billing records (MBR), as shown in step 714. The merged billing records (MBR) corresponding to the toll records and feature records are sorted based on the sort key discussed earlier. This ensures that the invoice is printed in the required sequence of conference calls for each customer and subtotals are regenerated at the various levels of grouping within a call.

10. The billing processor 114 prints the invoice generating sub-totals at various grouping levels, as shown in step 716. The invoice for each customer is printed using the file which contains the sorted merged billing records (MBR). The conference description is printed as a header line for each conference ID. For dial-out calls, the words "Dial-Out" and the dialed digits are printed on the charge line for a dial-out toll record. For meet-me calls, the words "Meet-Me" and the access number (800/Vnet®/Toll Meet-me number, etc.) are printed on the charge line for a meet-me toll record. For feature records, the feature charge/credit description is also printed.

The sub-total charges, generated and printed in each invoice pertaining to the conference, comprise a) toll charges for the conference; b) toll charges for each media for the conference on a mixed call; c) feature charges for the conference; and d) total charges for each Service Location ID.

Although, the above description dealt with the Vnet® billing, the non-Vnet processing of call records is identical to the billing processor 114 and is omitted to avoid redundancy.

Since those skilled in the art can modify the disclosed specific embodiment without departing from the spirit of the invention, it is, therefore, intended that the claims be interpreted to cover such modifications and equivalents.

What is claimed is:

1. In a telecommunications network, a system for processing billing information of a conference of calls carried on said telecommunications network, comprising:

reservation means for using information provided by a conference leader to generate a file referencing said conference, said file including an identifier for said conference;

switch means, in receipt of a dial-in call for said conference during call setup of said conference, for querying a database to retrieve routing information therefrom for routing said dial-in call, said dial-in call being tagged with said identifier;

a conference bridge for connecting said dial-in call to said conference in response to the routing thereof by said switch means, a call record that includes said identifier being generated by said switch means; and processing means for using said identifier to create a billing record for said dial-in call, group said dial-in call with calls of said conference, and print an invoice to be provided to at least one party identified to be responsible for charges incurred for said conference.

2. The system of claim 1, wherein said switch means generates said call record after said dial-in call is completed, said identifier of said call record identifying said call as relating to said conference.

3. The system of claim 1, wherein said processing means comprises a traffic processor and a billing processor; and wherein said call being an audio call.

4. The system of claim 1, wherein said processing means comprises a traffic processor and a billing processor; and wherein said call being a video call.

5. The system of claim 1, wherein said processing means comprises a traffic processor and a billing processor, said traffic processor establishing a billing option for each call of said conference based on said information provided by said conference leader, said billing option designating said at least one party responsible for paying charges for said each call.

6. The system of claim 1, wherein said processing means comprises a traffic processor and a billing processor; and wherein said billing processor (a) merges said conference file with said call record for each said calls of said conference and determines a charge for said each call;

(b) merges said conference file with a feature record for said each call and determines a charge for said each call;

(c) groups all calls pertaining to said conference; and (d) prints said invoice for said conference.

7. The system of claim 1, wherein said processing means comprises a traffic processor and a billing processor; and wherein said billing processor (a) generates sub-headings for said invoice; and (b) sorts information in each customer's record according to said sub-headings.

8. The system of claim 1, wherein said conference bridge is configured for routing dial-in calls to said conference by data in said file generated by said reservation system.

9. In a telecommunications network, a system for processing billing information of a conference of calls carried on said telecommunications network, comprising:

reservation means for using information provided by a conference leader to generate a file referencing said conference, said file including an identifier for said conference;

a conference bridge for receiving said identifier;

switch means, in receipt of a dial-out call from said conference, for retrieving from said conference bridge said identifier and tagging said dial-out call with said identifier during call setup, said switch means generating a call record that includes said identifier; and processing means connected to said reservation means and said switch means for using said identifier to create a billing record for said dial-out call, group said dial-out call with calls of said conference, and print an invoice to be provided to at least one party identified to be responsible for charges incurred for said conference.

10. The system of claim 9, wherein said switch means generates said call record after said dial-out call is completed, said identifier of said call record identifying said call as relating to said conference.

11. The system of claim 9, wherein said processing means comprises a traffic processor and a billing processor; and
   wherein said call being an audio call.

12. The system of claim 9, wherein said processing means comprises a traffic processor and a billing processor; and
   wherein said call being a video call.

13. The system of claim 9, wherein said processing means comprises a traffic processor and a billing processor, said traffic processor establishing a billing option for each call of said conference based on said information provided by said conference leader, said billing option designating said at least one party responsible for paying charges for said each call.

14. The system of claim 9, wherein said processing means comprises a traffic processor and a billing processor; and
   wherein said billing processor
   (a) merges said conference file with said call record for each said calls of said conference and determines a charge for said each call;
   (b) merges said conference file with a feature record for said each call and determines a charge for said each call;
   (c) groups all calls pertaining to said conference; and
   (d) prints said invoice for said conference.

15. The system of claim 9, wherein said processing means comprises a traffic processor and a billing processor; and
   wherein said billing processor
   (a) generates sub-headings for said invoice; and
   (b) sorts information in each customer's record according to said sub-headings.

16. The system of claim 9, wherein said conference bridge is configured for routing dial-out calls from said conference by data in said file generated by said reservation system.

17. A method of processing billing information for a conference of calls carried on a telecommunications network, comprising the steps of:
   (a) generating a file relating to said conference based on information provided by a conference leader;
   (b) assigning an identifier to each call of said conference during a call setup;
   (c) creating a call record for said each call upon its completion;
   (d) using said identifier for processing billing information for said conference including generating a billing record for said each call, grouping said each call with other calls of said conference, and printing an invoice to be provided to at least one party identified to be responsible for charges incurred for said conference.

18. The method of claim 17, wherein the generating of said billing record in said step d further comprises the steps of:
   merging said conference file with the call record of said each call;
   determining a charge for said each call of said conference;
   merging said conference file with a feature record for said each call; and
   determining a charge for said each call of said conference.

19. The method of claim 18, wherein said step d further comprises the steps of:
   establishing a billing option for said each call of said conference based on said information provided by said conference leader; and
   using said billing option to determine said at least one party responsible for paying charges for said each call.

20. The method of claim 18, wherein said step d further comprises the steps of:
   generating sub-headings for said invoice; and
   sorting information in said record for said each call according to said sub-headings.

* * * * *